United States Patent
Yoon et al.

(10) Patent No.: US 12,267,285 B2
(45) Date of Patent: Apr. 1, 2025

(54) APPARATUS AND METHOD FOR RESTRICTING DISPLAY OF MESSAGE IN MESSENGER SERVICE

(71) Applicant: KAKAO CORP., Jeju-si (KR)

(72) Inventors: Dae Won Yoon, Seongnam-si (KR); Ki Yong Shim, Seongnam-si (KR); Eun Jung Ko, Seoul (KR); Doo Won Lee, Seongnam-si (KR); Ji Sun Lee, Seongnam-si (KR)

(73) Assignee: Kakao Corp., Jeju-si (KR)

( * ) Notice: Subject to any disclaimer, the term of this patent is extended or adjusted under 35 U.S.C. 154(b) by 0 days.

(21) Appl. No.: 18/463,968

(22) Filed: Sep. 8, 2023

(65) Prior Publication Data

US 2024/0098048 A1 Mar. 21, 2024

(30) Foreign Application Priority Data

Sep. 19, 2022 (KR) ........................ 10-2022-0118207

(51) Int. Cl.
*H04L 51/063* (2022.01)
*H04L 51/04* (2022.01)
*H04L 51/18* (2022.01)

(52) U.S. Cl.
CPC ............ *H04L 51/063* (2013.01); *H04L 51/04* (2013.01); *H04L 51/18* (2013.01)

(58) Field of Classification Search
CPC ........ H04L 51/063; H04L 51/04; H04L 51/18
USPC .......................................................... 709/206
See application file for complete search history.

(56) References Cited

U.S. PATENT DOCUMENTS

| 2011/0213850 A1* | 9/2011 | Umeshima ............ H04L 51/063 |
| | | 709/206 |
| 2013/0195266 A1* | 8/2013 | Fischer .................. H04L 9/003 |
| | | 380/44 |
| 2014/0280638 A1* | 9/2014 | O'Dell .................. H04L 51/212 |
| | | 709/206 |
| 2015/0007351 A1* | 1/2015 | Janajri ................... H04L 51/10 |
| | | 726/30 |

(Continued)

FOREIGN PATENT DOCUMENTS

| CN | 113992615 A | 1/2022 |
| JP | 2015-201181 A | 11/2015 |
| KR | 10-2015-0105024 A | 9/2015 |

(Continued)

OTHER PUBLICATIONS

Office Action received in the Japanese Patent Application No. 2023-151067 mailed Sep. 10, 2024.

(Continued)

*Primary Examiner* — Cheikh T Ndiaye
*Assistant Examiner* — Ayele F Woldemariam
(74) *Attorney, Agent, or Firm* — Knobbe, Martens, Olson & Bear, LLP

(57) ABSTRACT

A method for displaying a message in a messenger service by a user terminal is proposed. The method may include receiving the message from a server. The method may also include receiving a mask command for the message from the server when text information extracted from the message satisfies a preset condition. The method may further include displaying a mask message corresponding to the message in a chat room of the messenger service based on the mask command.

14 Claims, 14 Drawing Sheets

(56) References Cited

U.S. PATENT DOCUMENTS

2019/0050600 A1* 2/2019 Sahoo ................. G06F 21/6281
2022/0245283 A1* 8/2022 Springer ................. G06F 21/84

FOREIGN PATENT DOCUMENTS

KR    10-2018-0001907 A    1/2018
KR    10-2022-0065531 A    5/2022
WO    WO-2016173449 A1 * 11/2016 ............. H04L 51/00

OTHER PUBLICATIONS

Office Action dated Nov. 6, 2024 in Korean Application No. 10-2022-0118207.

* cited by examiner

APPARATUS AND METHOD FOR RESTRICTING DISPLAY OF MESSAGE IN MESSENGER SERVICE

CROSS-REFERENCE TO RELATED APPLICATION

This application claims priority to and the benefit of Korean Patent Application No. 10-2022-0118207 filed on Sep. 19, 2022, the disclosure of which is incorporated herein by reference in its entirety.

BACKGROUND

Technical Field

The present disclosure relates to a messenger service, and more particularly, to a technique for restricting display of messages provided by a user in a messenger service.

Description of Related Technology

As the use of the Internet has become widespread and wireless communication technology has developed, the age group of the Internet users has expanded to include children, and various means to freely express their thoughts or opinions have been developed. In particular, with the widespread of wireless devices like smartphones, messenger services have become widely available, enabling people to engage in conversations with diverse people without constraints of time and location.

SUMMARY

The present disclosure aims to improve a service user's satisfaction by restricting display of a message containing a harmful word in a messenger service.

The present disclosure also aims to improve a service user's satisfaction by controlling a potential delay to a certain level or less when restricting display of a message containing a harmful word.

In one aspect of the present disclosure, there is provided a method for displaying a message in a messenger service by a user terminal, the method including: receiving the message from a server; receiving a mask command for the message from the server when text information extracted from the message satisfies a preset condition; and displaying a mask message corresponding to the message in a chat room of the messenger service based on the mask command.

The method may further include prior to receiving the mask command, displaying the message in the chat room. In the displaying of the mask message, the mask message may be displayed in place of the message.

The method may further include: displaying a push message corresponding to the message; and based on the mask command, replacing the push message with a mask push message corresponding to the mask message.

The method may further include: prior to displaying the mask message, receiving a reply message to the message from the server, the reply message which is generated by another user terminal; and displaying the reply message together with the message.

The method may further include: acquiring a display interaction regarding the mask message; and in response to the display interaction, displaying the mask message in place of the message.

The displaying of the mask message may be performed depending on whether the user terminal has approved a display setting of the mask message in the messenger service.

The displaying of the mask message may include: identifying a restricted text corresponding to the preset condition in the text information; and displaying a text other than the restricted text in the message.

In another aspect of the present disclosure, there is provided a user terminal for restricting display of a message in a messenger service, the user terminal including: a memory storing instructions; and a processor configured to execute the instructions to: receive the message from a server; receive a mask command for the message from the server when text information extracted from the message satisfies a preset condition; and display a mask message corresponding to the message in a chat room of the messenger service based on the mask command.

A computer program according to an embodiment of the present disclosure may be combined with hardware and stored in a medium to implement the above method.

In yet another aspect of the present disclosure, there is provided a method for restricting display of a message in a messenger service by a server, the method including: receiving the message from a second user terminal; transmitting the message to a first user terminal; determining whether text information extracted from the message satisfies a preset condition; and transmitting a mask command corresponding to the message to the first user terminal when the text information satisfies the preset condition.

The transmitting of the message may be performed when the text information satisfies the preset condition.

The transmitting of the message may be performed in response to acquiring a message transmission request from the first user terminal.

The determining of whether the text information extracted from the message satisfies a preset condition may be performed depending on whether a restriction setting of a chat room corresponding to the message is activated.

The determining of whether the text information extracted from the message satisfies a preset condition may include determining whether the text information comprises a preset keyword.

The determining of whether the text information comprises a preset keyword may include determining a restricted text matching the preset keyword in the text information, and the mask command may be a command for the second user terminal to display a text other than the restricted text in the message.

The method may further include identifying whether a determination as to whether the text information satisfies the preset condition is made within a threshold time. The transmitting of the message may be performed when it is determined that the text information satisfies the preset condition or when the determination is not made within the threshold time.

In yet another aspect of the present disclosure, there is provided a server for restricting display of a message in a messenger service, the server including: a memory storing instructions; and a processor configured to execute the instructions to: receive the message from a second user terminal; transmit the message to a first user terminal; determine whether text information extracted from the message satisfies a preset condition; and transmit a mask command corresponding to the message to the first user terminal when the text information satisfies the preset condition.

DETAILED DESCRIPTION

When some users transmit messages containing harmful words such as swearing or profanity through the messenger services, such words may cause discomfort to the other party, but there is no appropriate measure to restrict the harmful words. To solve this problem, there is a method in which a server of a messenger service stores, filters, or manages all messages in the server. However, in this method, resources and security are at risk, and the occurrence of a delay may lead to inconvenience for users who expect real-time message transmission. Accordingly, there is an increasing demand for an effective method for solving the aforementioned problems and restricting display of harmful words.

Hereinafter, embodiments of the present disclosure will be described in detail with reference to the accompanying drawings, and the same or similar components are given the same reference numbers and redundant description thereof is omitted. In addition, in the following description of the embodiments, a detailed description of known functions and configurations incorporated herein will be omitted when it may impede the understanding of the embodiments.

While terms including ordinal numbers, such as "first" and "second," etc., may be used to describe various components, such components are not limited by the above terms. The above terms are used only to distinguish one component from another.

The singular forms are intended to include the plural forms as well, unless the context clearly indicates otherwise.

In this application, steps described may be performed regardless of a listed order, except for a case where they must be performed in the listed order due to a special causal relationship.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, the present disclosure will be described with reference to the accompanying drawings.

Figure 1:
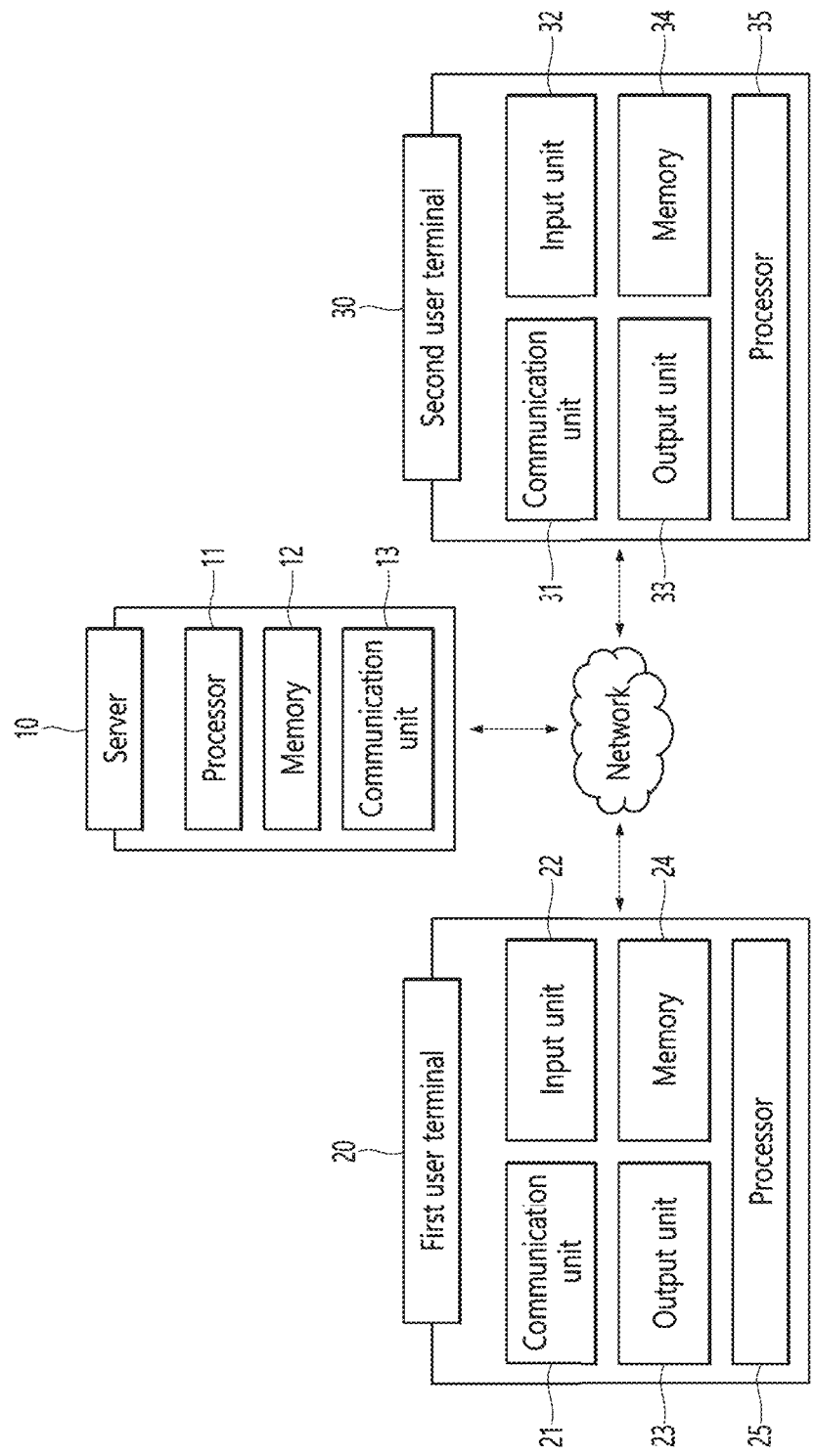
FIG. 1 is a diagram illustrating an example of a network environment according to an embodiment of the present disclosure.

FIG. 1 is a diagram illustrating an example of a network environment according to an embodiment of the present disclosure.

A network environment according to an embodiment of the present disclosure shown in FIG. 1 may include a server 10, a first user terminal 20, and a second user terminal 30.

The server 10 is a device that provides a messenger service to a user terminal. A user terminal exemplified as the first user terminal 20 and the second user terminal 30 is a device that uses the messenger service provided by the server 10.

The messenger service may be a service that allows a plurality of users to transmit or receive messages to or from each other through a platform provided by the server 10. Here, it may be understood that the message includes all transmittable data such as texts, photos, videos, voice files, and emoticons.

Communication schemes for a network is not limited. The communication schemes may include not only a communication scheme to utilize a telecommunication network (for example, a mobile communication network, wired Internet, wireless Internet, and a broadcast network), but also a short-range radio communication scheme.

The server 10 may be implemented as a computer device or a plurality of computer devices that provide commands, codes, files, contents, services, and the like. The server 10 may be a server 10 capable of transmitting and receiving information through communication with a user terminal via a network.

The server 10 may include a processor 11, a memory 12, and a communication unit 13.

The processor 11 may provide a messenger service to the user terminal by controlling overall operations of the memory 12 and the communication unit 13.

The memory 12 serves as a storage medium and may store a plurality of application programs running on the server 10, and data and instructions for operating the server 10. In one embodiment, an application associated with a messenger service may be stored in the memory 12.

This memory 12 may be provided in the form of any of various hardware storage devices such as an ROM, an RAM, a flash drive, a hard drive, etc. or may be provided in the form of web storage.

The communication unit 13 may communicate with the user terminal via a network in a wired or wireless manner.

The server 10 of the present disclosure receives a message from the first user terminal 20, transmits the message to the second user terminal 30, extracts text information from the message, determines whether the text information satisfies a preset condition, and transmits a mask command to the second user terminal when the text information satisfies the preset condition.

Here, the message may be a message input by a first user to a chat room of a messenger service through the first user terminal 20. The chat room is where the message is input may be a chat room where the first user and a second user are participating. The message may include at least one text information item.

Here, the text information may be at least one text information item acquired from an input device of the first user terminal. The text information may constitute at least part of the message. For example, when a message includes a sentence and an emoticon, text information of the message may be a sentence without the emoticon.

Also, the text information itself or in combination with another text information may deliver at least one meaning in the message. Here, at least one meaning may include swearing, profanity, and an inappropriate expression that may cause discomfort to the other party (hereinafter, referred to as a "restricted expression."

Here, the preset condition may be a condition for determining whether a restricted expression is included in the text information. More specifically, the server 10 may determine whether a restricted expression is included in the text information based on a pre-stored restricted expression list or a matching algorithm for filtering any restricted expression (hereinafter, referred to as "prior information"). The server 10 may determine whether dictionary information and text information match each other by simply comparing the same, or may determine a similarity between the dictionary information and the text information based on a predetermined similarity discriminant criterion. Depending on whether the similarity is greater than or equal to a threshold value, the server 10 may determine whether the text information includes a restricted expression.

Here, a mask command may be a command for controlling a message generated by the first user terminal 20 to switch to a mask message in a chat room of a messenger service. Here, the mask message may be another message in which a part or all of an original message is not displayed. When the server 10 transmits a mask command to the second user terminal 30, the second user terminal 30 may display a mask message corresponding to a message in the chat room. When a message is already displayed in the chat room, the mask message may be displayed in place of the message.

Here, transmitting, by the server 10, the message to the second user terminal 30 and determining, by the server 10, whether the text information satisfies a preset condition may be performed, regardless of order.

The first user terminal 20 is a terminal device that receives an original message or a mask command from the server 10 and acquires a display input from the user. The first user terminal 20 may include a communication unit 21, an input unit 22, an output unit 23, a memory 24, and a processor 25.

The communication unit 21 may communicate with the server 10 or other terminals in a wired/wireless manner.

The input unit 22 may receive various types of information through a user's manipulation and input behavior. Such an input unit may be a touch screen module, a keyboard, a mouse, a button, a camera, a stylus, and a microphone.

The first user terminal 20 may receive a user's interaction through the input unit 22. The interaction means that the user operates the input unit 22 to input information to which the user's selection or intention is applied to the first user terminal 20. For example, the interaction may be a touch on a touch screen, a click of a mouse, typing of a keyboard, a sound input to a microphone, an image capture by a camera, motion recognition by a motion sensor, and the like.

The output unit 23 may output any of various types of information. The output unit 23 may be a display device, a speaker, a vibration generating device, a tactile sensation generating device, and the like. In some cases, the output unit 23 may be a device (e.g., Bluetooth earphone) that is connected to a user terminal through wired or wireless communication (e.g., short-range radio communication such as Bluetooth) to receive and output a signal.

The memory 24 serves as a storage medium and may store a plurality of application programs running on a user terminal, and data and instructions for operating the first user terminal 20. This memory may be provided in the form of any of various hardware storage devices such as an ROM, an RAM, a flash drive, a hard drive, etc. or may be provided in the form of web storage. In one embodiment, an application associated with a messenger service providing a group chat room function may be stored in the memory 24.

Such an application may include information on other users registered as friends of the user in the messenger service.

In the present disclosure, the first user terminal 20 receives a message from the server 10. When text information extracted from the message satisfies a preset condition, the first user terminal 20 receives a mask command for the message from the server 10. Based on the mask command, a mask message corresponding to the message received from the server 10 is displayed in the chat room of the messenger service.

In the present disclosure, the second user terminal 30 is a terminal device corresponding to a second user. The second user terminal 20 is the same as or similar to the first user terminal 20. The second user is a user participating in the same chat room where the first user is participating. The second user terminal 30 may include a communication unit 31, an input unit 32, an output unit 33, a memory 34, and a processor 35. The respective components included in the second user terminal 30 performs substantially the same functions as the components included in the first user terminal 20. The second user terminal 30 may receive a message generated by the first user terminal 20 from the server 10 and display the received message.

Figure 2:
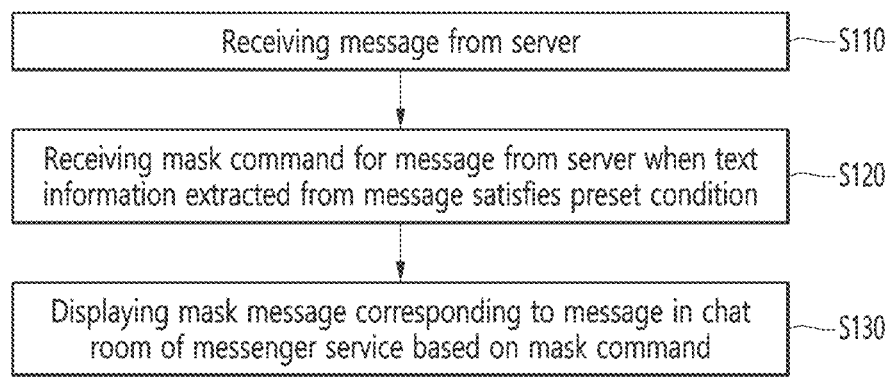
FIG. 2 is a flowchart of operations of a first user terminal according to an embodiment of the present disclosure.

FIG. 2 is a flowchart of operations of the first user terminal 20 according to an embodiment of the present disclosure.

Operations described in FIG. 2 may be performed regardless of a listed order, except for a case where they must be performed in the listed order due to a special causal relationship. However, in the following description, it is assumed that the operations are performed in the listed order for convenience of description.

In operation S110, the first user terminal 20 receives a message from the server 10.

The message may be a message including text information input by the second user to a chat room of a messenger service through the second user terminal 30. Here, the chat room may be a chat room in which the first user is participating. Hereinafter, such a message may be referred to as an original message to be distinguished from a mask message.

In operation S1201, the first user terminal 20 receives a command to hide the message from the server 10 when text information extracted from the message satisfies a preset condition.

The mask command may be a control command for restricting display of the original message. Based on the mask command, the first user terminal 20 may display a mask message for the original message without displaying the original message from the beginning, or may display the original message and then replace the original message with the mask message.

Extracting the text information from the original message or determining whether the extracted text information satisfies the preset condition may be performed by the server 10. The order of operations S110 and S120 may vary depending on an embodiment of the present disclosure.

According to a first embodiment of the present disclosure, operation S110 may be performed after the server 10 determines whether the text information corresponds to the preset condition in operation S1201. For example, when the text information of the message satisfies the preset condition, the server 10 may transmit the message to the first user terminal 20 along with a mask command. On the other hand, when the text information of the message does not satisfy the preset condition, the server 10 may transmit the message to the first user terminal 20 without transmitting the mask command.

Accordingly, according to the first embodiment of the present disclosure, the first user terminal 20 may receive the message after determining whether the text information of the message satisfies the preset condition. Also, when the text information satisfies the preset condition, the first user terminal 20 may receive the mask command together. The first embodiment may be referred to as a "synchronous scheme." A detailed description of the first embodiment will be described below with reference to FIG. 10.

According to a second embodiment of the present disclosure, operation S110 may be performed even before the server 10 determines whether the text information satisfies the preset condition in operation S120.

For example, when acquiring a message from the second user terminal 30, the server 10 may transmit the corresponding message to the first user terminal 20, regardless of whether operation S120 is performed or completed. Thereafter, when text information included in the corresponding message satisfies a preset condition in operation S1201, a mask command may be transmitted to the first user terminal 20.

Therefore, according to the second embodiment of the present disclosure, the first user terminal 20 may first display a message received from the server 10 in the chat room of the messenger service, and then, in response to acquiring a mask command from the server 10, perform a subsequent operation of replacing the message with a mask message. The second embodiment may be referred to as an "asynchronous scheme." A detailed description of the second embodiment will be described below with reference to FIGS. 11 and 12.

According to a third embodiment of the present disclosure, operation S110 may be performed in response to acquiring an input to the mask message displayed by the first user terminal 20 in operation S1301. More specifically, the first user terminal 20 may display the mask message according to operation S1301, but may not receive the original message from the server 10. Thereafter, when a triggering condition for acquiring the original message is satisfied in the first user terminal 20, operation S110 may be performed. The third embodiment may apply only to the "synchronous scheme." A detailed description of the third embodiment will be described below with reference to FIG. 11.

In operation S1301, the first user terminal 20 displays a mask message corresponding to the original message in the chat room of the messenger service based on the mask command.

Displaying the mask message corresponding to the original message may be performed differently depending on whether the original message is already displayed in the chat room. Specifically, when the original message is already displayed in the chat room, operation S130 may include displaying the mask message in place of the original message. When the original message is not displayed in the chat room from the beginning, operation S130 may be performed in such a way that simply displays the mask message.

A case where an original message is already displayed in a chat room means a case where the message is transmitted to a terminal device of at least one user participating in the chat room and is displayed on a screen of the first user terminal 20 as "sending."

The mask message may include an explanatory phrase indicating that display of the original message has been restricted because a "restricted expression" potentially causing discomfort to others is included.

Figure 3:
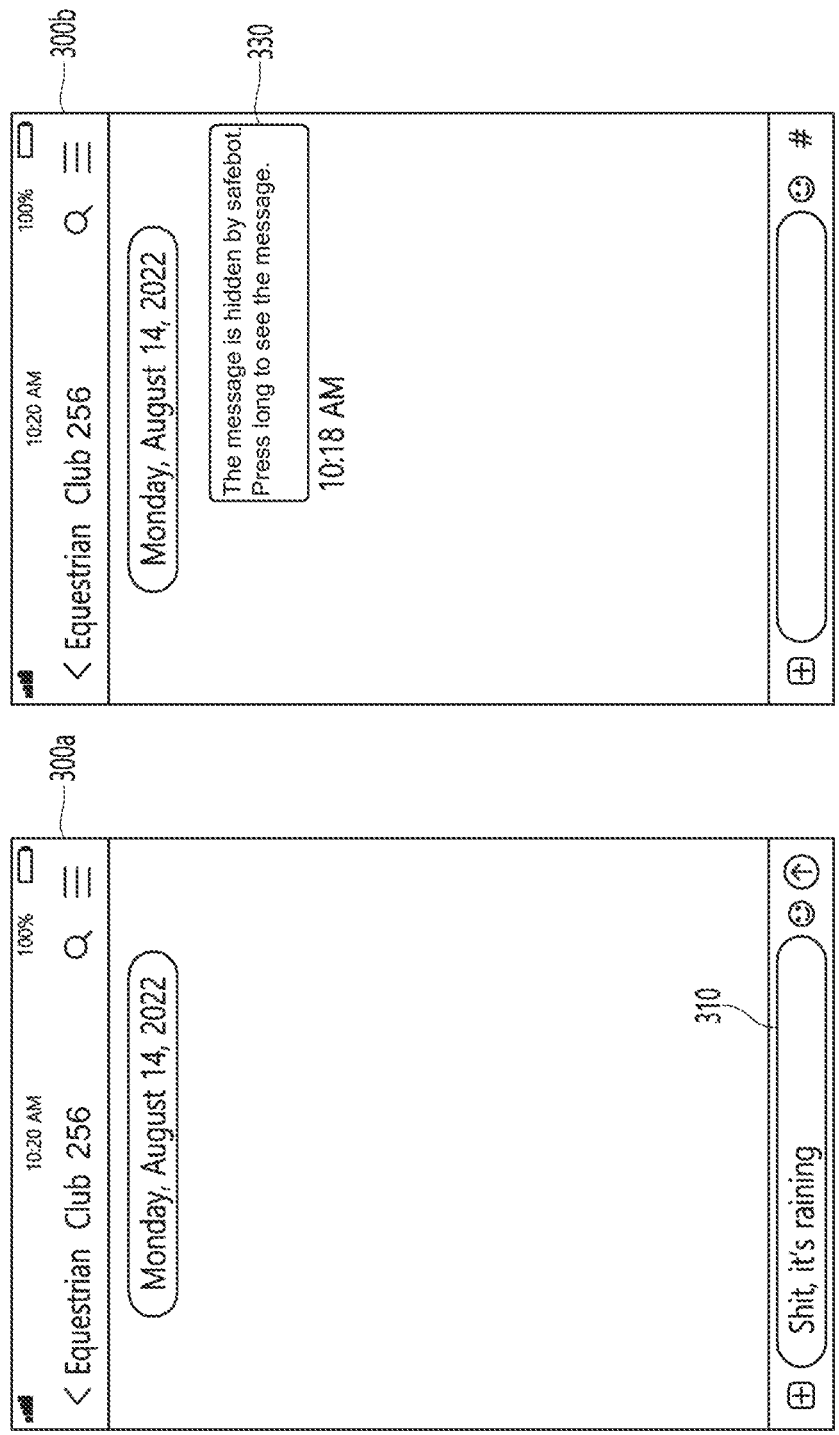
FIG. 3 illustrates examples of a first screen for inputting a message in a second user terminal and a second screen for displaying a mask message in the second user terminal according to an embodiment of the present disclosure.

FIG. 3 illustrates a first screen 300a for inputting a message in the second user terminal 30 and a second screen 300b for displaying a mask message in the second user terminal 30 according to an embodiment of the present disclosure.

The first screen 300a and the second screen 300b are screens for a chat room of a messenger service displayed on the second user terminal 30. The chat room may be a chat room in which the first user and the second user are participating. Preferably, the chat room may be an open chat room managed by the creator of the chat room and allowing a plurality of users to participate.

The second user may input a message 310 to the first screen 300a through the second user terminal 30. The message 310 may include at least one text information item. Referring to FIG. 3, text information included in the message 310 entered in the first screen 300a may include a restricted expression (e.g., "shit"). When the second user inputs a message into the chat room through the second user terminal 30 and transmits the message to the server 10, the server 10 may determine whether text information included in the entered message satisfies a preset condition. Specifically, the server 10 may determine whether there is a restricted expression in the text information included in the message 310. For example, in at least one text information item included in the message 310, "shit" corresponding to a mask command may be identified.

When the server 10 determines that the text information included in the message 310 satisfies the preset condition, the server 10 provides a mask command to display the mask message 330 in place of the message 310. Here, the mask command provided from the server 10 may be transmitted to user terminals of all users included in the chat room. For example, the server 10 may transmit a mask command to the first user terminal 20 and the second user terminal 30.

Referring to FIG. 3, the second user terminal 30 may display the mask message 330 in the chat room based on the mask command provided from the server 10.

Figure 4:
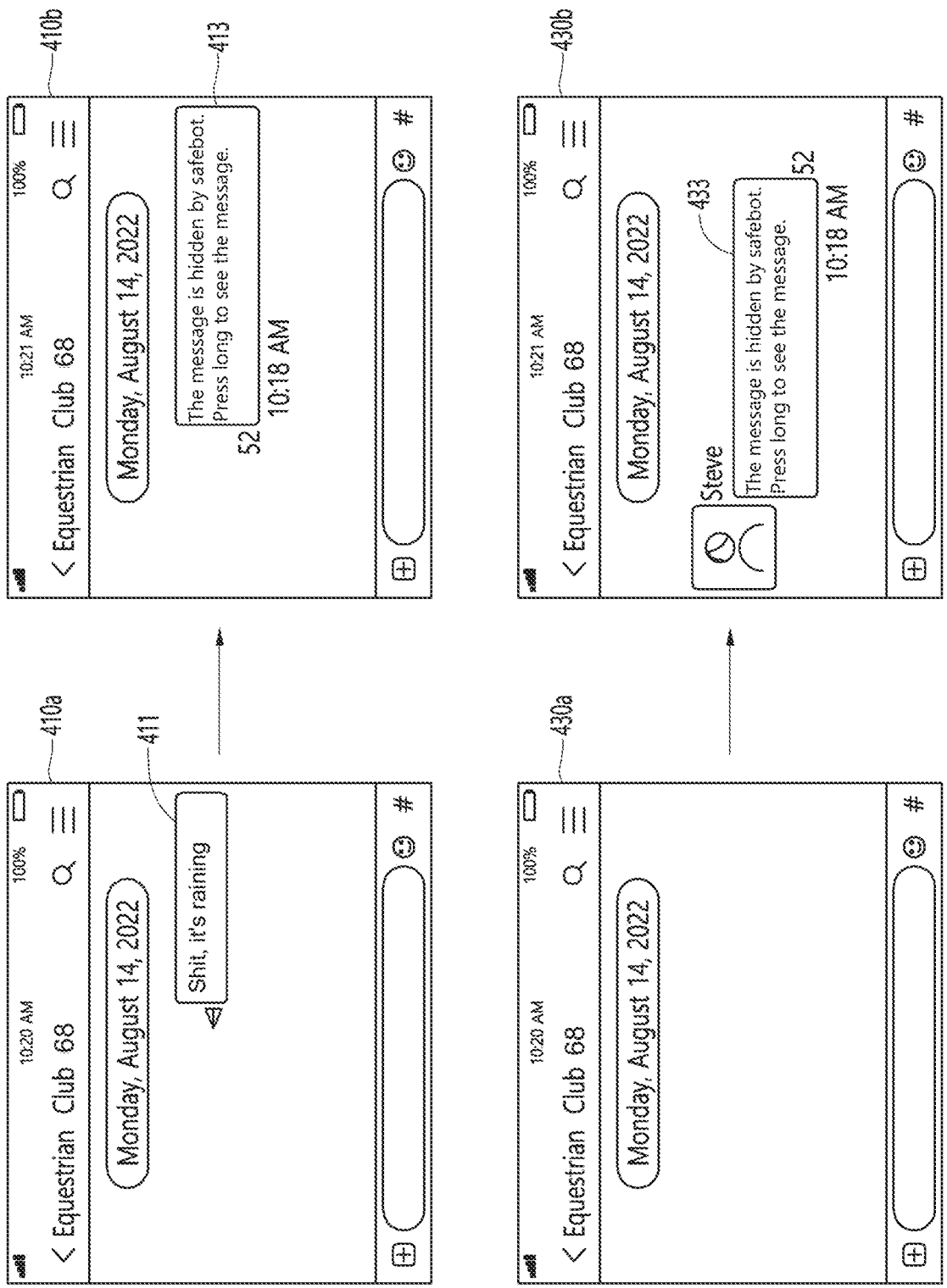
FIG. 4 illustrates an exemplary screen on which a first user terminal and a second user terminal display messages based on a synchronous scheme according to an embodiment of the present disclosure.

FIG. 4 illustrates an exemplary screen on which the first user terminal 20 and the second user terminal 30 display a message based on a synchronous scheme according to an embodiment of the present disclosure.

Referring to FIG. 4, after the second user enters a message, a (2-1)-th screen 410a and a (2-2)-th screen 410b may be displayed on the second user terminal 30 and a (1-1)-th screen 430a and a (1-2)-th screen 430b may be displayed on the first user terminal 20.

The (2-1)-th screen 410a and the (1-1)-th screen 430a may be screens respectively displayed on the second user terminal 30 and the first user terminal 10 at the same time. In addition, the (2-2)-th screen 410b and the (1-2)-th screen 430b may be screens respectively displayed on the second user terminal 30 and the first user terminal 10 at the same time.

According to the above-described synchronous scheme, the server 10 may not transmit a message transmitted by the user terminal to any other user terminal until determining whether text information included in the message satisfies a preset condition (hereinafter, referred to as "filtering"). Here, the other user terminal may be a user terminal of a user other than the second user, that is, another user participating in the chat room in which the message is input.

Since the message input by the second user terminal 30 is not transmitted to the first user terminal 20 until the server 10 completes the filtering, the (1-1)-th screen 430a of the first user terminal 20 may not display the corresponding message. Also, at the same time, an icon (e.g., a paper airplane) indicating that transmission of a corresponding message 411 is not completed may be displayed together with the message on the (2-1)-th screen 410a of the second user terminal 30.

Thereafter, when the filtering by the server 10 is completed and the text information included in the message satisfies the preset condition, the server 10 may transmit a mask command to the first user terminal 20 and the second user terminal 30. In addition, the server 10 may transmit the original message together with the mask command to the first user terminal 20.

Conversely, after the filtering by the server 10, if it is determined that the text information included in the corresponding message does not satisfy the preset condition, the server 10 may transmit the original message to the first user terminal 20.

Referring to FIG. 4, as a result of the filtering, the server 10 may transmit a mask command to the first user terminal 20 and the second user terminal 30, and the first user terminal 20 and the second user terminal 30 may display a mask message 433 and 413 on the (1-2)-th screen 430b and the (2-2)-th screen 410b based on the mask command. The mask message 413 of the (2-2)-th screen 410b may be displayed in place of the message 411 of the (2-1)-th screen 410a.

As such, in the case of using the synchronous scheme, the first user terminal 20 may not display the original message unless intentionally deciding to display the original message with knowing that a restricted expression potentially causing discomfort to the first user is included in the original message.

Figure 5:
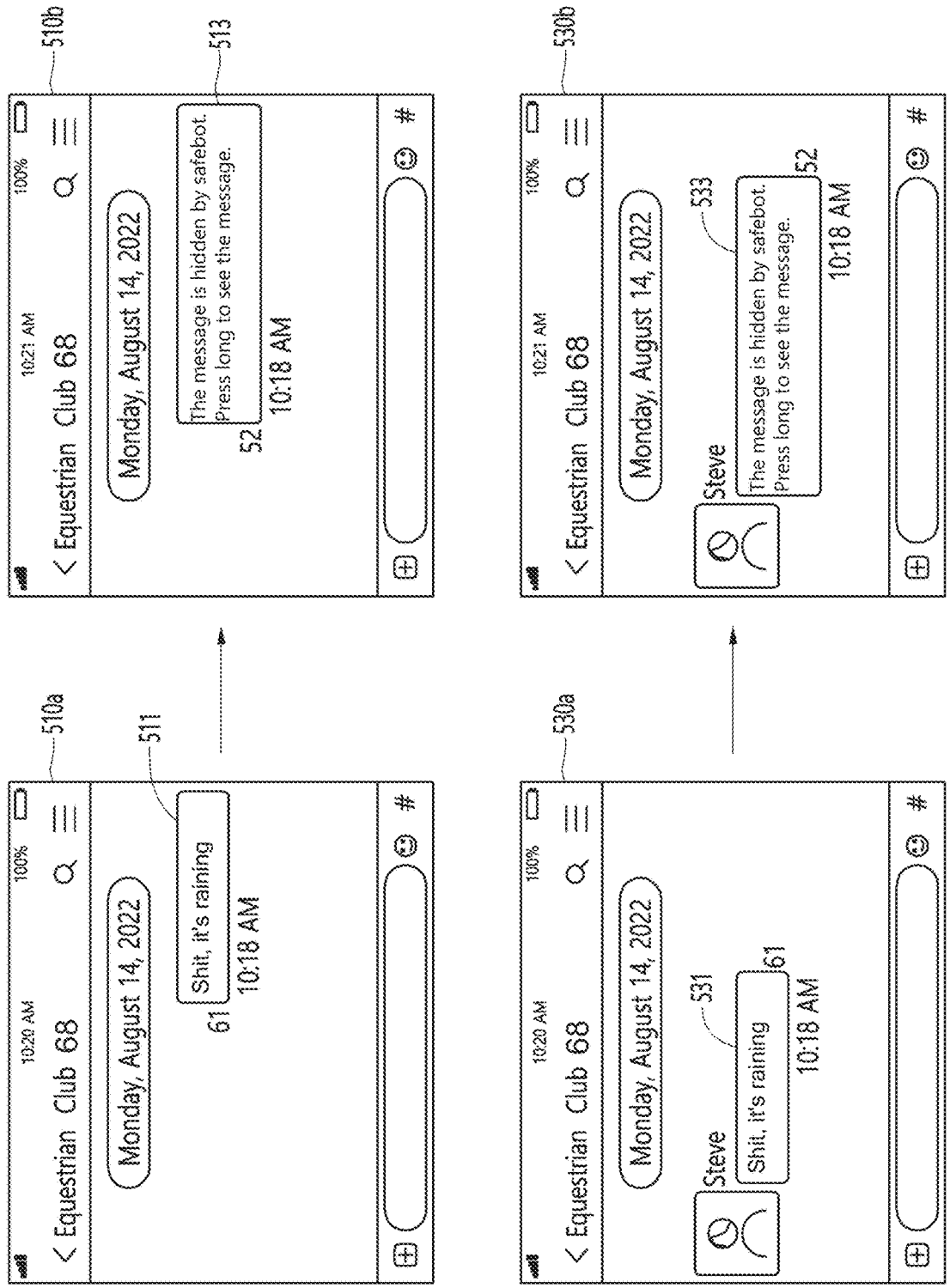
FIG. 5 illustrates an exemplary screen on which a first user terminal and a second user terminal display messages based on an asynchronous scheme according to an embodiment of the present disclosure.

FIG. 5 illustrates an exemplary screen on which the first user terminal 20 and the second user terminal 30 display messages based on an asynchronous scheme according to an embodiment of the present disclosure.

Referring to FIG. 5, after the second user enters a message, a (2-1)-th screen 510a and a (2-2)-th screen 510b may be displayed on the second user terminal and a (1-1)-th screen 530a and a (1-2)-th screen 530b may be displayed on the first user terminal.

The (2-1)-th screen 510a and the (1-1)-th screen 530a may be screens respectively displayed on the second user terminal 30 and the first user terminal 10 at the same time. In addition, the (2-2)-th screen 510b and the (1-2)-th screen 530b may be screens respectively displayed on the second user terminal 30 and the first user terminal 10 at the same time.

Based on the asynchronous scheme, the server 10 may transmit a message to another user terminal even before completing the filtering.

Since the message input by the second user terminal 30 is transmitted to the first user terminal even before the server 10 completes the filtering, the corresponding message 531 and 511 may be displayed on the (1-1)-th screen 530a of the first user terminal 20 and the (2-1)-th screen 510a of the second user terminal 30.

Thereafter, when the filtering by the server 10 is completed and text information included in the corresponding message satisfies a preset condition, the server 10 may transmit a mask command to the first user terminal 20 and the second user terminal 30.

Referring to FIG. 5, according to the filtering, the server 10 may transmit the mask command to the first user terminal 20 and the second user terminal 30, and the first user terminal 20 and the second user terminal 30 may display a mask message 533 and 513 on the (1-2)-th screen 530b and the (2-2)-th screen 510b based on the mask command. Here, it may be understood that displaying the mask messages is displaying the mask messages in place of the original message previously displayed on the (2-1)-th screen 510b and the (2-2)-th screen 530b.

As such, in the case of using the asynchronous scheme, the original message may be quickly transmitted. However, even when a restricted expression is included in the original message, the original message may be temporarily exposed in the first user terminal 20.

Figure 6:
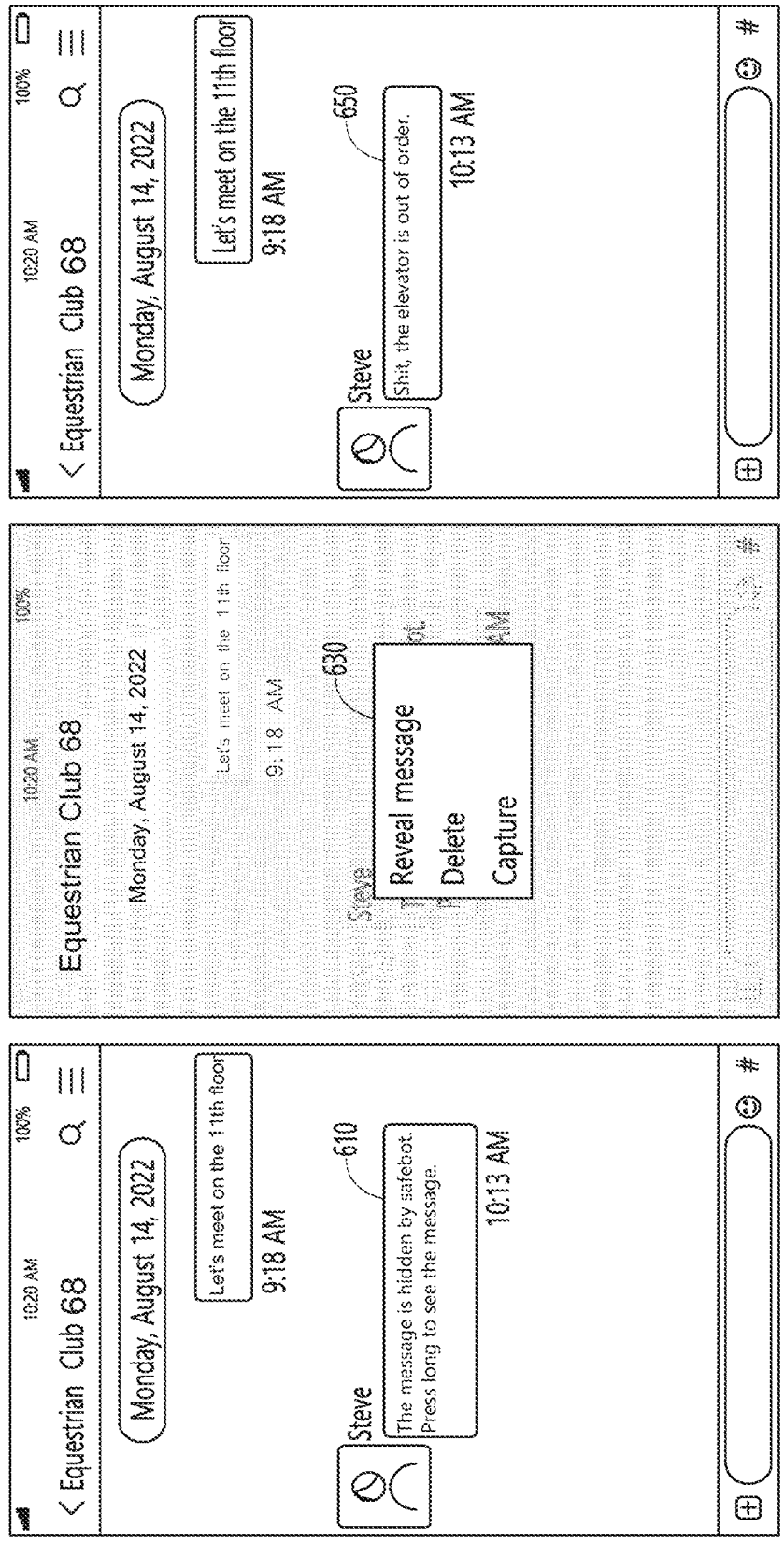
FIG. 6 illustrates an exemplary screen on which a first user terminal displays a mask message and an original message according to an embodiment of the present disclosure.

FIG. 6 illustrates an exemplary screen on which the first user terminal 20 displays a mask message and an original message according to an embodiment of the present disclosure.

When a message input by the second user to the chat room satisfies a preset condition, the message may be replaced with a mask message 610 on the screen of the first user terminal 20. The mask message 610 may include a predetermined explanatory phrase, instead of text information included in the original message. For example, the explanatory phrase may be a phrase explaining that displaying of the original message is restricted due to an inappropriate expression detected, that an input for displaying the original message is guided, etc.

The first user may provide the first user terminal 20 with an interaction regarding the mask message 610. In this case, the interaction may include a touch of an area where the mask message 610 is displayed, or an input for a preset shortcut command.

In response to acquiring the interaction, the first user terminal 20 may display the mask message 610 in place of an original message 650. Specifically, the first user terminal 20 may display at least one item 630 for performing a predetermined operation associated with the mask message 610 according to the interaction. For example, at least one item 630 may include "Reveal Message", "Delete", and "Capture." When the first user selects "Reveal Message"

from the at least one item 630, the first user terminal 20 may display the original message 650 for the mask message 610.

In some cases, the original message 650 displayed according to the first user's interaction may be replaced with a mask message when information displayed in the chat room is refreshed. For example, the original message displayed according to the first user's interaction may be again replaced with the mask message when the first user calls the chat room screen after exiting the chat room and returning to a chat room list or when the screen showing the original message is scrolled down in the chat room to cause the original message no longer visible on the screen and is then scrolled up to show the original message again.

Figure 7:
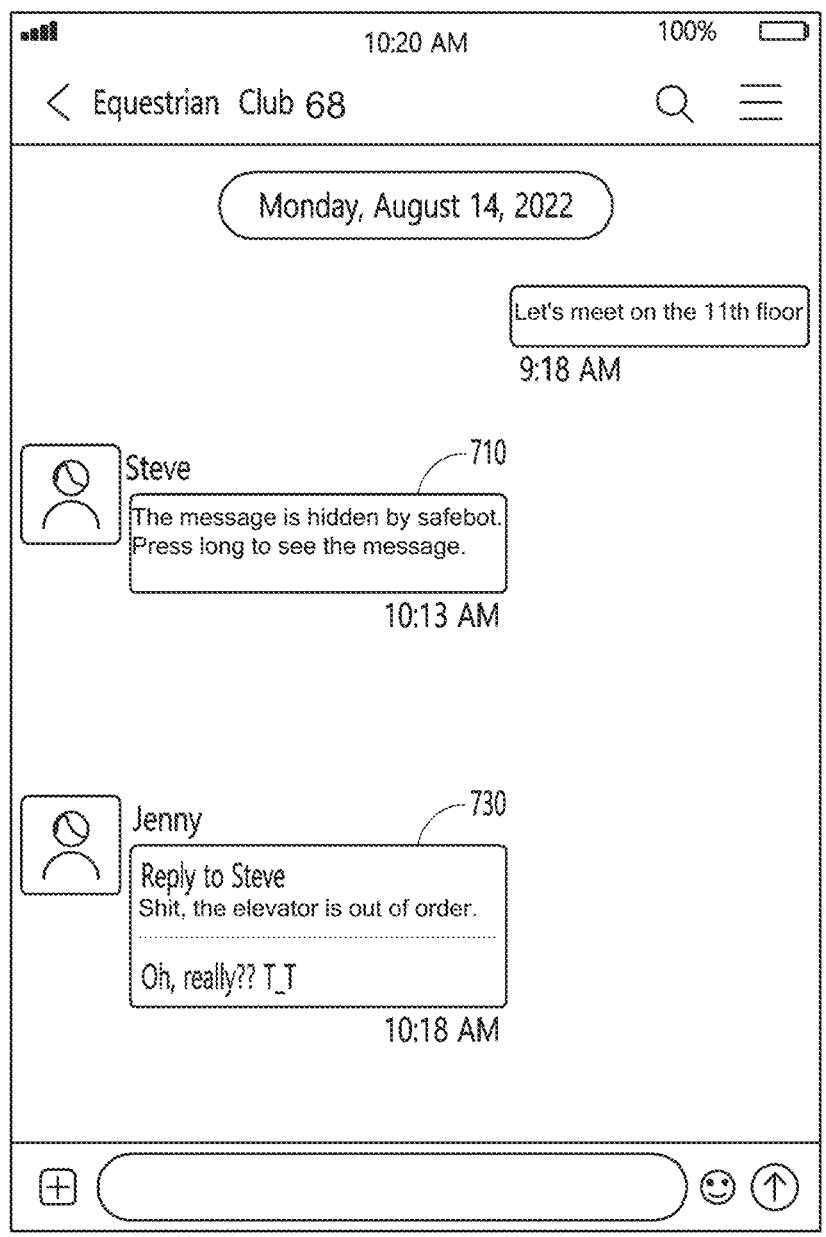
FIG. 7 illustrates another exemplary screen on which a first user terminal displays a mask message and an original message according to an embodiment of the present disclosure.

FIG. 7 illustrates another exemplary screen on which the first user terminal 20 displays a mask message and an original message according to an embodiment of the present disclosure.

When text information included in a message input to the chat room by the second user (e.g., Steve) satisfies a preset condition, the first user terminal 20 may display a mask message 710 based on a mask command of the server 10.

In order to check an original message corresponding to the mask message 710, the first user may provide an interaction to the first user terminal 20 according to an embodiment of FIG. 6.

In addition, another user (e.g., Jenny) participating in the chat room may check the original message corresponding to the mask message 710 through his or her user terminal and input a reply message to the original message. In this case, even when the first user does not provide an interaction, the first user terminal 20 may display a reply message 730 including the original message.

Figure 8:
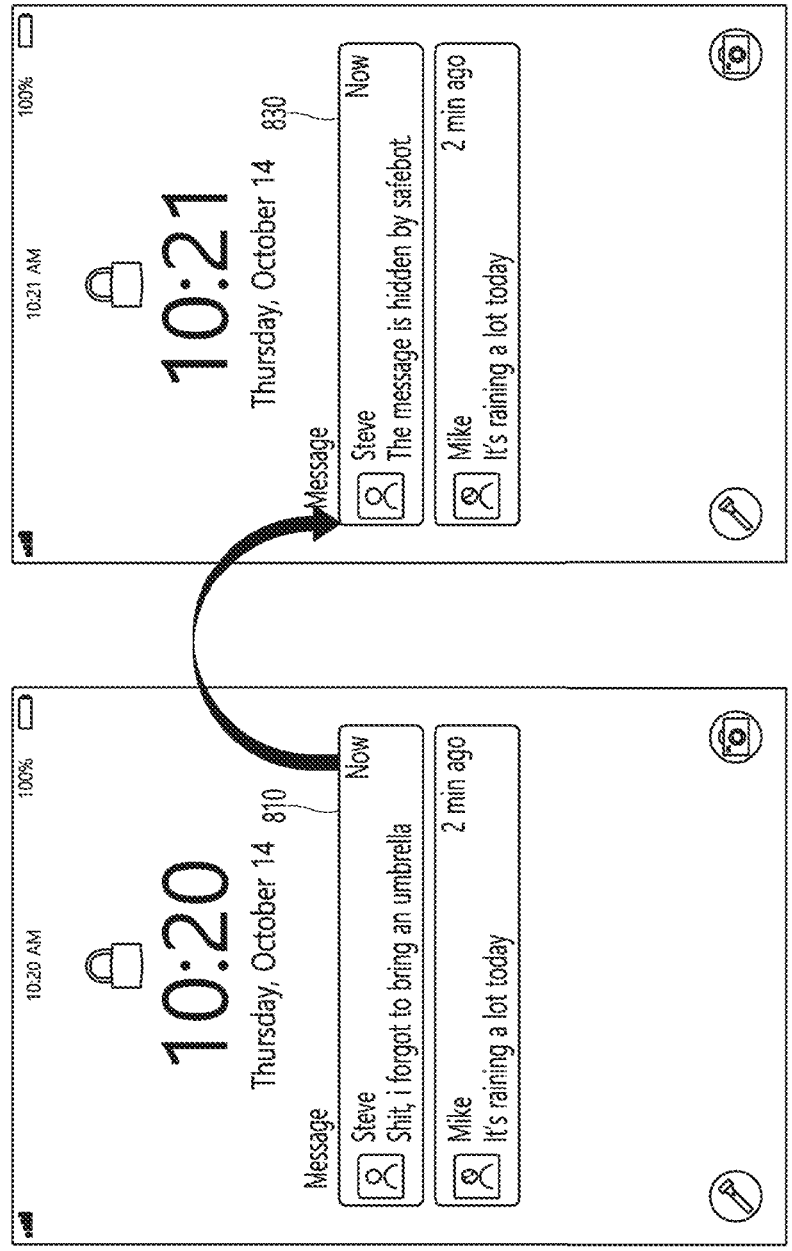
FIG. 8 illustrates an exemplary screen on which a first user terminal displays a push message according to an embodiment of the present disclosure.

FIG. 8 illustrates an exemplary screen on which the first user terminal 20 displays a push message according to an embodiment of the present disclosure.

Referring to FIG. 8, displaying the push message by the first user terminal 20 may be performed in an asynchronous manner.

The push message may be a notification message displayed on the screen of the first user terminal 20 when the first user terminal 20 receives a new message in a state in which the chat room screen is not displayed on the first user terminal 20. The push message may include text information included in the message. The state in which the chat room screen is not displayed on the first user terminal 20 may include a case where the first user terminal is in idle mode, a case where an application associated with the messenger service is not running in the first user terminal, or a case where the first user terminal has not entered the chat room.

In a situation where the first user terminal 20 is not displaying the chat room screen, if the second user (e.g., Steve) inputs a message into the chat room through the second user terminal 30, the input message may be displayed in the form of a push message in the first user terminal 20.

For example, when the first user terminal is in the lock mode and the second user inputs a message including text information "Shit, I forgot to bring an umbrella" to the chat room, the message input by the second user may be displayed in the form of a message 810 on a lock screen of the first user terminal 20. Using the push message 810, the first user may check the message input by the second user without entering the chat room.

The server 10 may transmit the message input by the second user to the first user terminal 20 (hereinafter, referred to as "transmission") and determine whether text information included in the message satisfies a preset condition (hereinafter, referred to as "filtering"). In an asynchronous state, the server 10 may perform the transmission and the filtering independently.

As a result of the filtering, when it is determined that the text information included in the message satisfies a preset condition, the server 10 may transmit a mask command to the first user terminal 10.

In response to the mask command, the first user terminal 20 may display a mask push message 830 to replace the push message 810. The mask push message 830 may correspond to a mask message. The first user terminal 20 may display the mask push message 830 and hide the previously displayed push message 810.

Therefore, the first user terminal 20 displays the push message 810 until hiding the push message, and after the push message 810 is hidden, the mask push message 830 is displayed instead of the push message 810.

Figure 9:
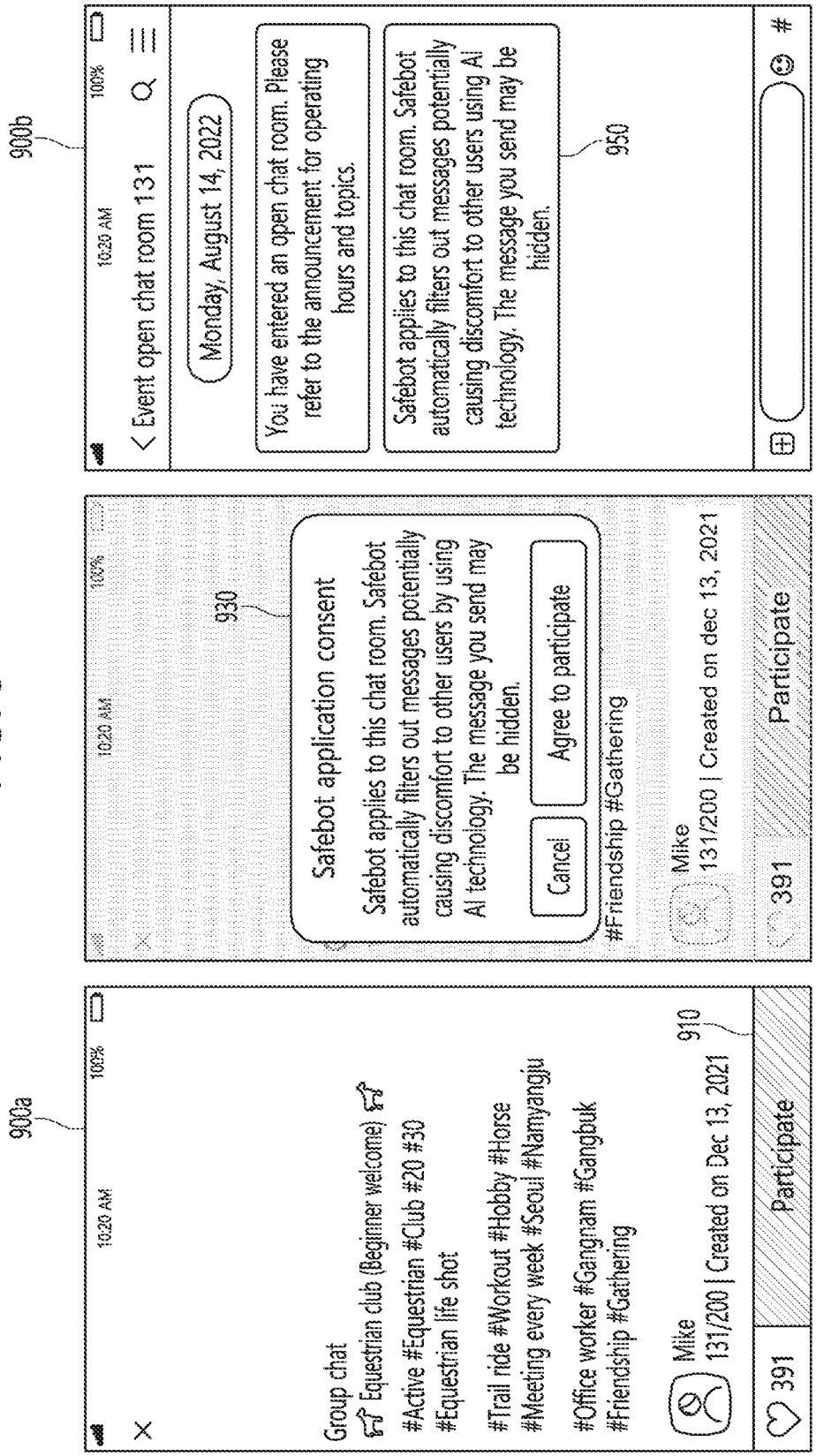
FIG. 9 illustrates an exemplary screen on which a first user terminal enters a chat room according to an embodiment of the present disclosure.

FIG. 9 illustrates an exemplary screen on which the first user terminal 20 enters a chat room according to an embodiment of the present disclosure.

Referring to FIG. 9, the chat room may be a group chat room that is open to a plurality of users. The first user may determine a chat group chat room to participate, and enter the group chat room by providing a participation interaction to the first user terminal 20. For example, the first user may provide a participation interaction to a participation interface 910 on a chat room description screen 900a displayed on the first user terminal 20. In response to the participation interaction of the first user, the first user terminal 20 may display a screen 930 requesting the consent from the first user according to a restricted expression setting of the group chat room.

Here, the restricted expression setting may be a setting for replacing a message already displayed or to be displayed in the group chat room with a mask message when text information included in the message satisfies a preset condition.

Since the restricted expression setting is a setting of the group chat room, the restricted expression setting of the group chat room may be activated or deactivated by the creator of the group chat room or by an external input. Referring to FIG. 9, the consent requesting screen 930 may be displayed when the restricted expression setting of the group chat room is activated.

The first user may enter the group chat room by providing an interaction to the interface "Agree to participate" on the consent requesting screen 930.

When the first user participates in the group chat room, a message acquired by the server 10 from a user terminal of any participant of the group chat room from a time point after the first user participates may be displayed on a group chat room screen 900b. In addition, upon entering the group chat room, the first user terminal 20 may display an explanatory phrase about the restricted expression setting on the group chat room screen 900b. The explanatory phrase may be a phrase explaining that a message input by any participant of the group chat room may be replaced with a mask message when a restricted expression is included in the message.

FIGS. 10 to 13 are flowcharts of operations between devices included in a network environment according to an embodiment of the present disclosure. The operations between devices may be performed differently depending on a synchronous scheme, an asynchronous scheme, and a hybrid scheme.

In the synchronous scheme, the server 10 may analyze a message received from the first user terminal 20 and transmit information associated with the message to the first user terminal 20 according to an analysis result.

In the asynchronous scheme, the server 10 may deliver a message received from the first user terminal 20 to the second user terminal 30 without waiting for an analysis result, and then transmit follow-up information to the first user terminal 20 based on the analysis result.

In the hybrid scheme, if an analysis result is not acquired within a predetermined threshold time, the server 10 may deliver a message received from the second user terminal 30 to the first user terminal 20, and if the analysis result is acquired within the predetermined threshold time, the server 10 may transmit information associated with the message to the first user terminal 20 based on the analysis result.

Figure 10:
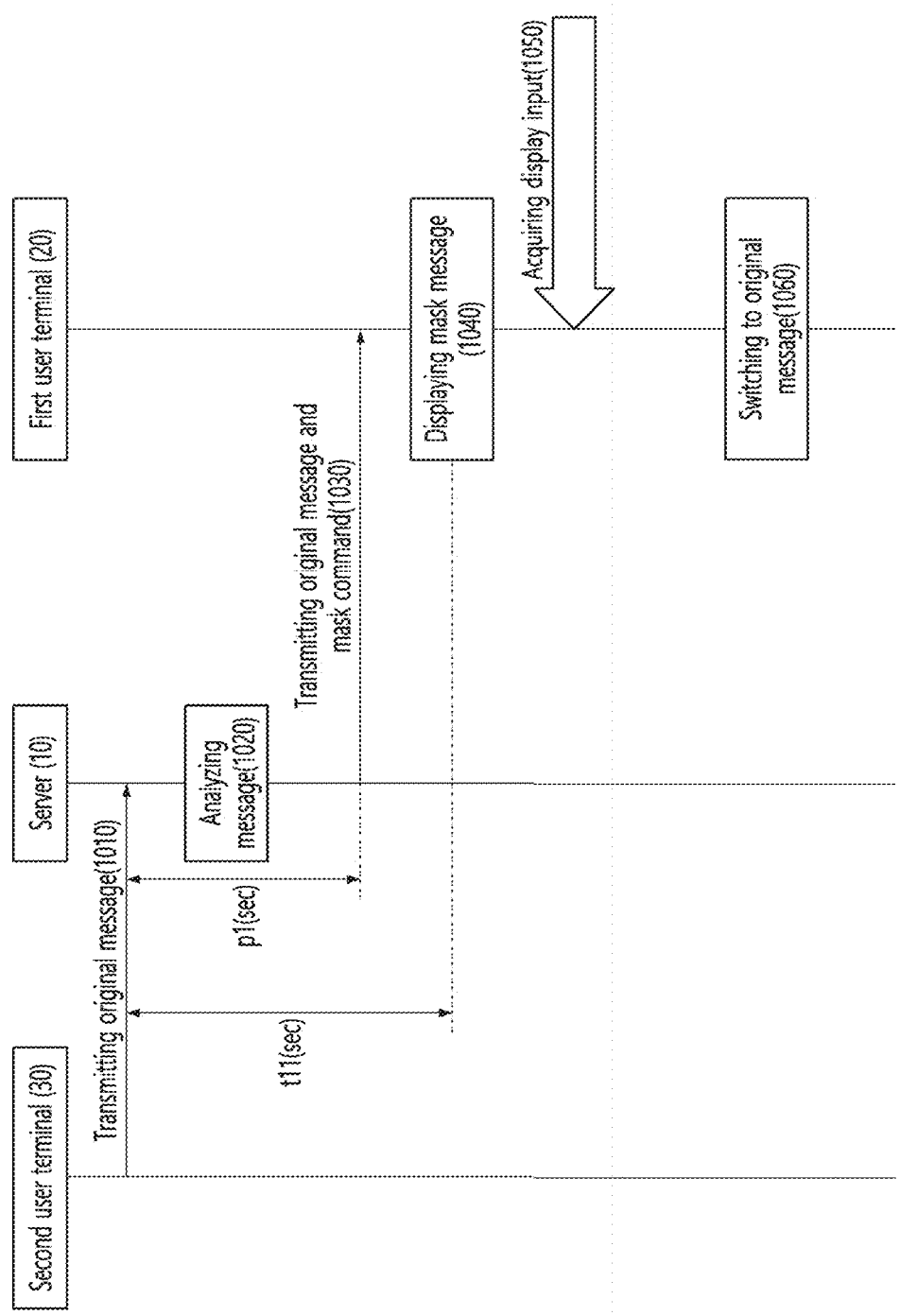
FIG. 10 is a flowchart of operations between devices based on a synchronous scheme according to an embodiment of the present disclosure.

FIG. 10 is a flowchart of operations between devices based on a synchronous scheme according to an embodiment of the present disclosure.

Referring to FIG. 10, the second user terminal 30 may transmit an original message to the server 10 in operation 1010, and the server 10 may analyze the original message in operation 1020. Analyzing the message by the server 10 may include determining whether text information included in the original message satisfies a preset condition.

According to a result of the analysis, when it is determined that the text information of the original message satisfies the preset condition, the server 10 may transmit the original message and a mask command to the first user terminal 20 in operation 1030. On the other hand, when it is not determined that the text information of the original message satisfies the preset condition, the server 10 may transmit the original message to the first user terminal 20 (not shown).

Having received the original message, the first user terminal 20 may display not the original message, but only the mask message corresponding to the original message based on the received mask command in operation 1040. Thereafter, when the first user terminal 20 may acquire a display input requesting display of the original message from the first user in operation 1050, the first user terminal 20 may switch the mask message to the original message in operation 1060.

Referring to FIG. 10, when the synchronous scheme is used, a time t11 may be required from a time point when the second user terminal 30 transmits the original message to a time point when the first user terminal 20 displays a message associated with the original message (e.g., the mask message). Here, t11 may be the time including a time required for the server 10 to analyze the original message.

In addition, when the server 10 transmits not only the mask command but also the original message to the first user terminal 20 in operation 1030, the server 10 may transmit the original message received from the second user terminal 30 for a time p1.

Figure 11:
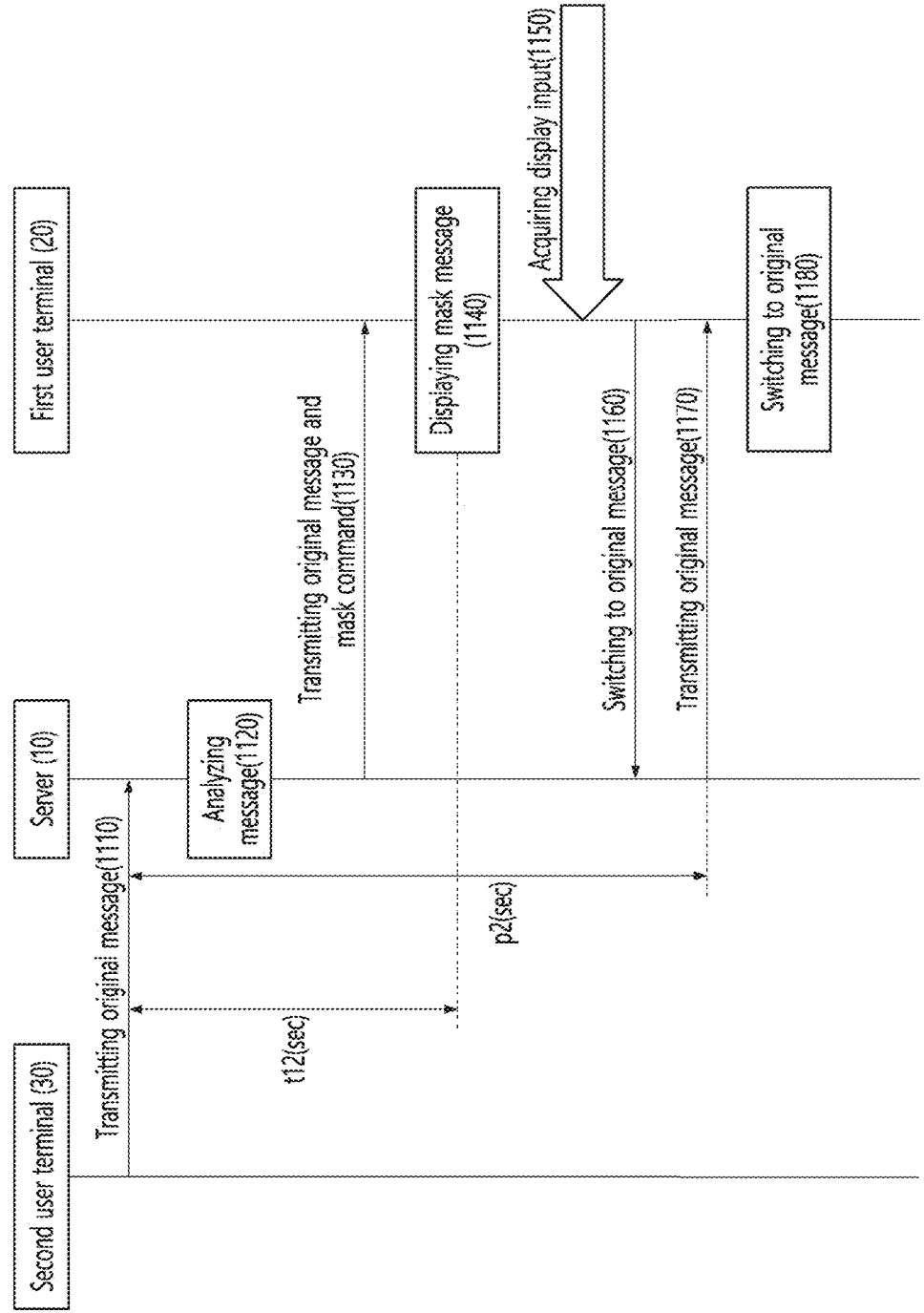
FIG. 11 is another flowchart of operations between devices based on a synchronous scheme according to an embodiment of the present disclosure.

FIG. 11 is another flowchart of operations between devices based on a synchronous scheme according to an embodiment of the present disclosure.

Referring to FIG. 11, the second user terminal 30 may transmit an original message to the server 10 in operation 1110, and the server 10 may analyze the original message in operation 1120. Analyzing the message by the server 10 may include determining whether text information included in the original message satisfies a preset condition.

According to a result of the analysis, when it is determined that text information of the original message satisfies a preset condition, the server 10 may transmit a mask command to the first user terminal 20 in operation 1030. Here, unlike the above description provided with reference to FIG. 10, the server 10 may not transmit the original message, but transmit only the mask command. When it is not determined that the text information of the original message satisfies the preset condition, the server 10 may transmit the original message to the first user terminal (not shown).

The first user terminal 20 may display a mask message corresponding to the original message based on the received mask command in operation 1140. Thereafter, when the first user terminal 20 acquires a display input requesting display of the original message from the first user in operation 1150, the first user terminal 20 may request the original message from the server 10 in operation 1160.

Thereafter, when the server 10 transmits the original message to the first user terminal 20 in response to the request for the original message in operation 1170, the first user terminal 20 may switch the mask message to the original message in operation 1180.

Referring to FIG. 11, when the synchronous scheme is used, t12 may be required from a time point when the second user terminal 30 transmits the original message to a time point when a message associated with the original message (e.g., a mask message) is displayed on the first user terminal 20. Here, t12 may be a time including a time required for the server 10 to analyze the original message.

In addition, when the server 10 transmits only the mask command without the original message to the first user terminal 20 in operation 1130, the server 10 may store therein the original message received from the second user terminal 30 for a time p2. In this case, in the synchronous scheme of FIG. 11 than in the synchronous scheme of FIG. 10, it may take a longer time for the server 10 to store the original message (p1<p2).

Figure 12:
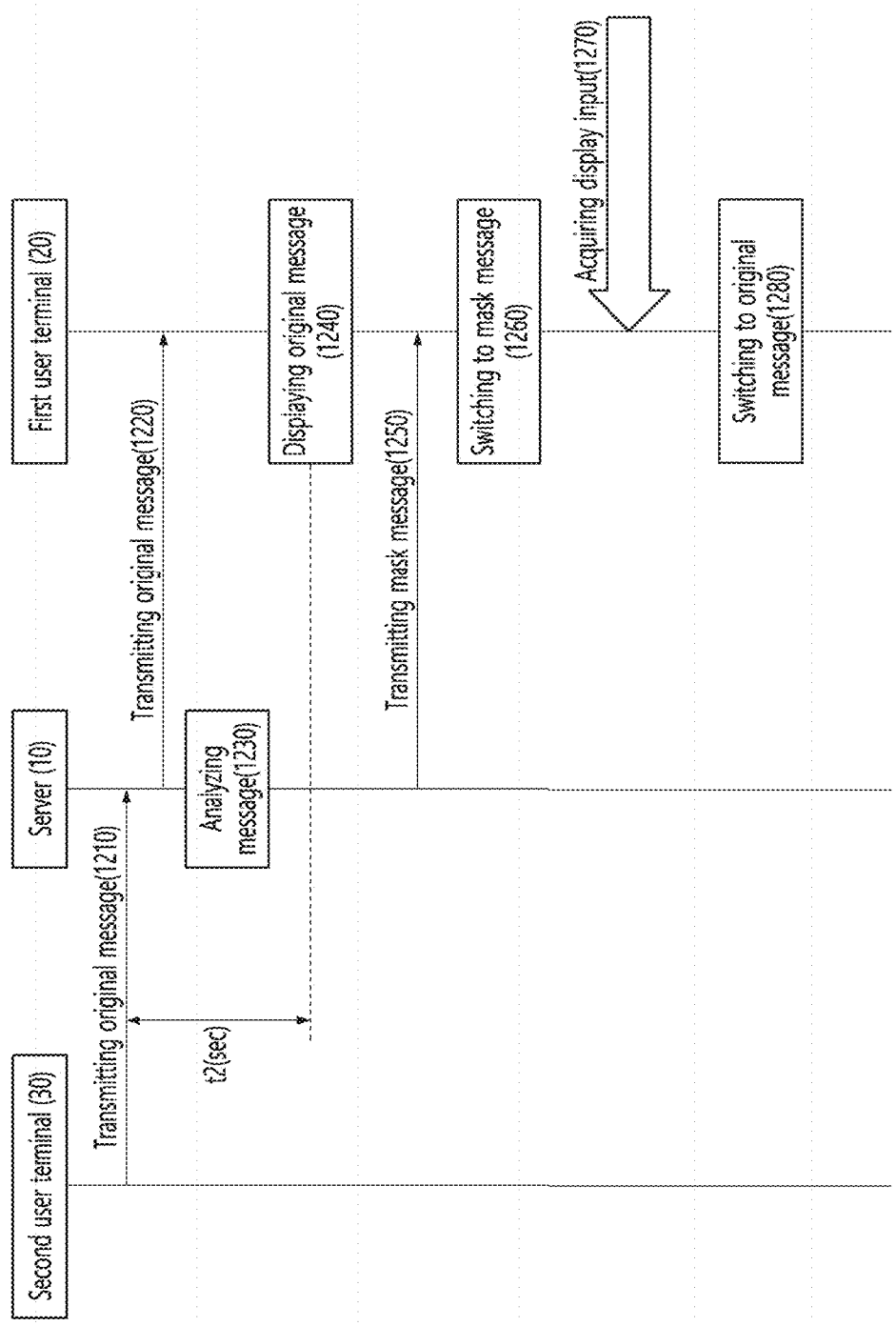
FIG. 12 is a flowchart of operations between devices based on an asynchronous scheme according to an embodiment of the present disclosure.

FIG. 12 is a flowchart of operations between devices based on an asynchronous scheme.

Referring to FIG. 12, the second user terminal 30 may transmit an original message to the server 10 in operation 1210, and the server 10 may transmit the received original message to the first user terminal 20 in operation 1220 and analyze the original message in operation 1230. Operation 1220 of transmitting the original message by the server 10 may be performed prior to or simultaneously with operation 1230 of analyzing the original message. Analyzing the original message may include determining whether text information included in the original message satisfies a preset condition.

The first user terminal 20 may display the received original message in operation 1240. FIG. 12 shows a case where operation 1240 of displaying the original message by the first user terminal 200 is performed after operation 1230 of analyzing the original message by the server 10, but it is also possible that operation 1240 of displaying the original message by the first user terminal 200 is performed prior to operation 1230 of analyzing the original message by the server 10.

According to a result of the analysis, when it is determined that the text information of the original message satisfies the preset condition, the server 10 may transmit a mask command to the first user terminal 20 in operation 1250. On the other hand, when it is not is determined that the text information of the original message satisfies the preset condition, the server 10 may end the process or transmit a result of failing to satisfy the present condition to the first user terminal 20.

The first user terminal 20 may switch the displayed original message to a mask message based on the mask command received from the server 10 in operation 1260.

Thereafter, when the first user terminal 20 acquires a display input requesting display of the original message from the first user in operation 1270, the first user terminal 20 may switch the mask message back to the original message in operation 1280.

Referring to FIG. 12, when the asynchronous scheme is used, t2 may be required from a time point when the second user terminal 30 transmits the original message to a time point when a message associated with the original message (e.g., a mask message) is displayed on the first user terminal 20. Here, t2 may be a time not related to a time required for the server 10 to analyze the original message.

Figure 13:
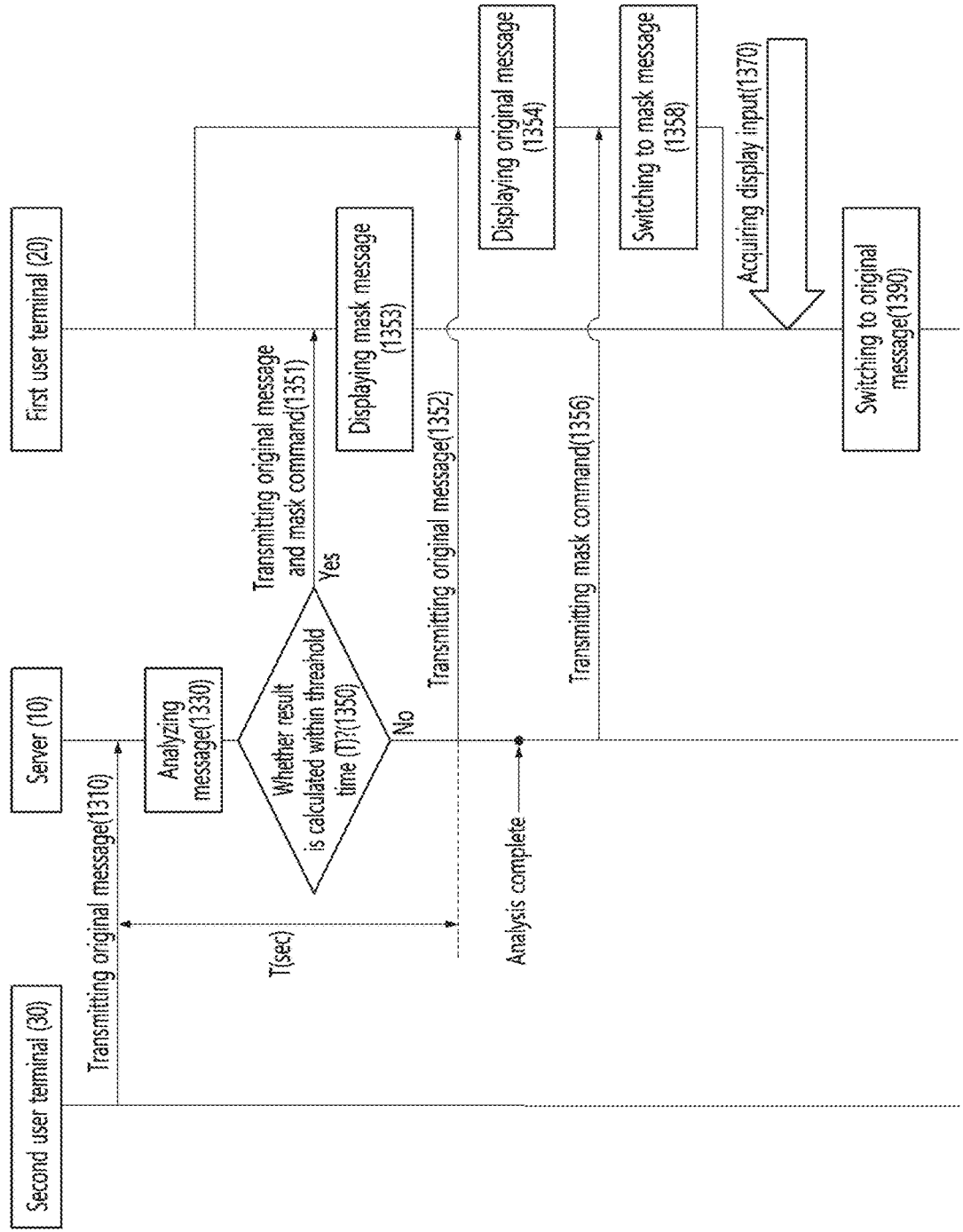
FIG. 13 is a flowchart of operations between devices according to a hybrid scheme according to an embodiment of the present disclosure.

FIG. 13 is a flowchart of operations between devices according to a hybrid scheme according to an embodiment of the present disclosure.

Referring to FIG. 13, the second user terminal 30 may transmit an original message to the server 10 in operation 1310, and the server 10 may analyze the original message in operation 1330. Analyzing the message by the server 10 may include determining whether text information included in the original message satisfies a preset condition.

According to a result of the analysis, when it is determined that the text information of the original message satisfies the preset condition (hereinafter, referred to as "masking condition"), the server 10 may transmit the original message and a mask command to the first user terminal 20. On the other hand, when it is not determined that the text information of the original message satisfies the masking condition, the server 10 may transmit the original message to the first user terminal 20 (not shown).

Here, transmitting the original message and the mask command to the first user terminal 20 may be performed together as described later or may be performed sequentially according to a predetermined criterion.

The server 10 may determine whether a result of message analysis is calculated within a threshold time T. When the result is calculated within the threshold time T and the original message satisfies the masking condition, the server 10 may transmit the original message and the mask command to the first user terminal 20 in operation 1351.

The first user terminal 20 may display not the original message, but a mask message corresponding to the original message based on the received mask command in operation 1353. Thereafter, when the first user terminal 20 acquires a display input requesting display of the original message from the first user in operation 1370, the first user terminal 20 may display the original message in operation 1390.

If the result is not calculated within the threshold time T, the server 10 may transmit the original message to the first user terminal 20 and the first user terminal 20 may display the original message received from the server 10 in operation 1354. Thereafter, when the original message satisfies the masking condition according to the calculated result after an elapse of the threshold time T, the server 10 may transmit a mask command for the original message to the first user terminal 20 in operation 1356 and the first user terminal 20 may switch the displayed original message to a mask message based on the mask command received from the server 10 in operation 1358. Thereafter, when the first user terminal 20 acquires a display input requesting display of the original message from the first user in operation 1370, the first user terminal 20 may switch the mask message to the original message in operation 1390.

The threshold time T may be determined based on a delay that causes discomfort to another user of the chat room of the messenger service. According to the hybrid scheme, the server 10 may first acquire information on a threshold time that is long enough for a user to feel a delay. When message analysis completed within the threshold time, the server 10 may use the synchronous scheme, and when the message analysis is not completed within the threshold time, the server 10 may use the asynchronous scheme by which the original message is first transmitted.

Therefore, the hybrid scheme switches the synchronous scheme and the asynchronous scheme based on the threshold time, thereby addressing the drawback of the asynchronous scheme, which temporarily displays a restricted expression potentially causing discomfort to others, and the drawback of the synchronous scheme, which causes inconvenience due to a delay.

Figure 14:
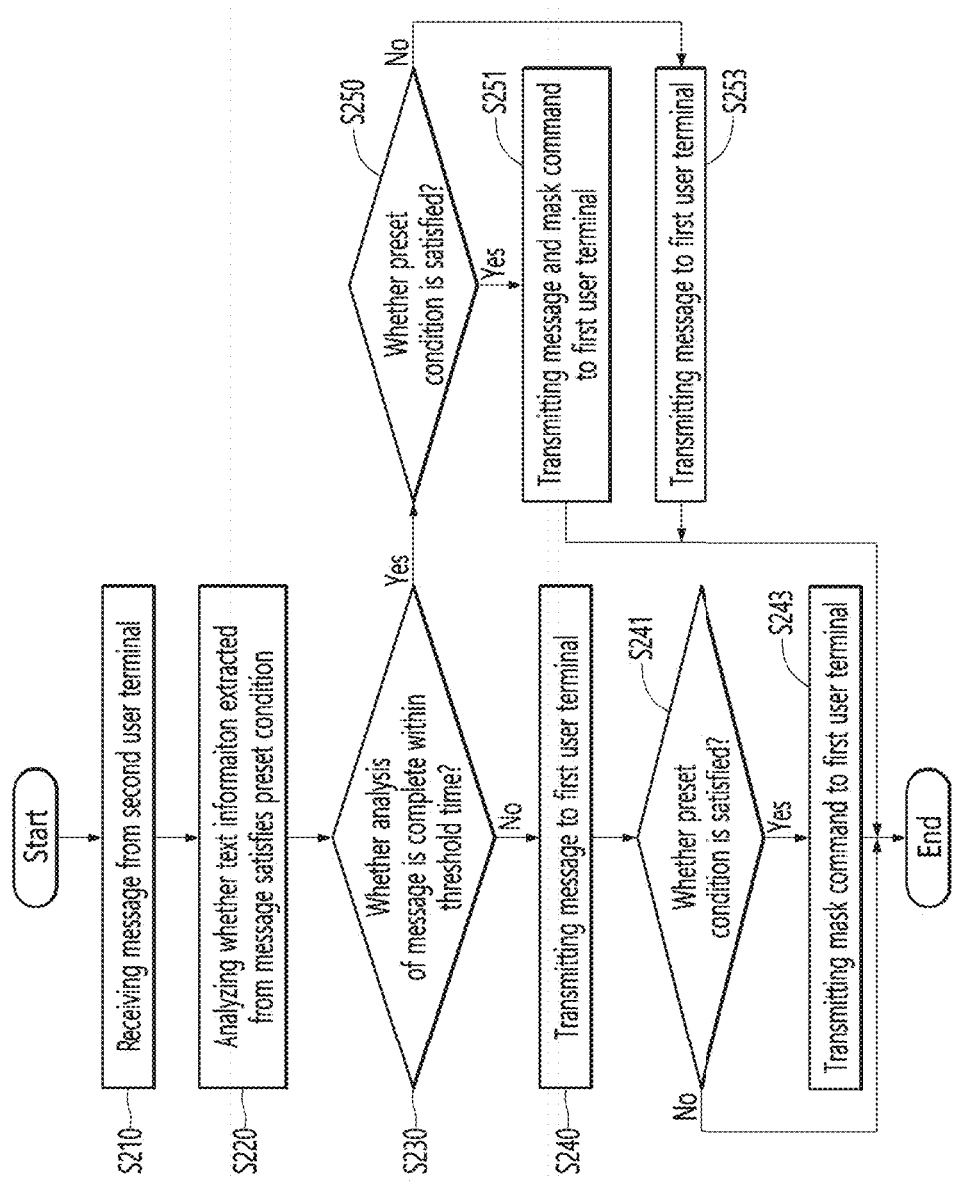
FIG. 14 is a flowchart of operations of a server according to an embodiment of the present disclosure.

FIG. 14 is a flowchart of operations of the server 10 according to an embodiment of the present disclosure.

In FIG. 14, the server 10 may operate based on the hybrid scheme that selectively performs the synchronous scheme or the asynchronous scheme based on a threshold time.

In operation S210, the server 10 receives a message from the second user terminal 20.

Operation S210 may be understood as corresponding to operation S110 of FIG. 2.

In operation S220, the server 10 extracts text information from the message and analyzes whether or not the extracted text information satisfies a preset condition.

Here, the preset condition may be a condition for determining whether a restricted expression is included in the text information. More specifically, the server 10 may determine whether any restricted expression is included in the text information based on a pre-stored restricted expression list or a matching algorithm for filtering restricted expressions (hereinafter, referred to as "prior information").

In operation S230, the server 10 checks whether the message analysis of operation S220 is completed within the threshold time.

The threshold time may be determined based on a delay that causes discomfort to a user of a chat room of a messenger service. For example, when the threshold time is T sec, the server 10 may determine whether a result of the message analysis is acquired within T sec after the start of the message analysis. When the result of the message analysis is not acquired within T sec after the start of the message analysis, the server 10 may confirm that the message analysis is not completed within the threshold time. If the result of message analysis is acquired within T sec after the start of the message analysis, the server 10 may confirm that the message analysis is complete within the threshold time.

The server 10 performs operation S250 when the message analysis is completed within the threshold time. Or, the server 10 performs operation S240 when the message analysis is not completed.

In operation S240, the server 10 transmits a message to the first user terminal 20. In this case, the transmitted message may be a message transmitted from the second user terminal 30 to the server 10. The first user terminal 20 may display the message received from the server 10.

The server 10 may acquire a result of the message analysis after transmitting the message to the first user terminal 20. When the server 10 acquires the result of the message analysis, the server 10 may perform operation S241.

In operation S241, the server 10 determines whether text message included in the message satisfies a preset condition (hereinafter, referred to as "masking condition") according to the result of the message analysis. If the message satisfies the masking condition, the server 10 performs operation S243, and if not, the server 10 ends the process.

In operation 243, the server 10 transmits a mask command to the first user terminal 20.

The first user terminal 20 may replace the displayed message with the mask message based on the mask command received from the server 10.

In operation S250, the server 10 determines whether the message satisfies the masking condition, according to the result acquired within the threshold time. If the message satisfies the masking condition, the server 10 performs operation S251, and if not, performs step 253.

In operation S251, the server 10 may transmit a message and a mask command to the first user terminal 20. The first user terminal 20 may display a mask message corresponding to the message based on the received mask command.

In operation S253, the server 10 may transmit the message to the first user terminal 20. The first user terminal may display the received message.

In the present disclosure, it is possible to improve a messenger service user's satisfaction by restricting display of a message containing a harmful word.

In addition, in the present disclosure, it is possible to improve a messenger service user's satisfaction by controlling a potential delay to a certain level or less when restricting display of a message containing a harmful word.

The technical features disclosed in each embodiment of the present disclosure are not limited to a corresponding embodiment, and unless incompatible with each other, the technical features disclosed in each embodiment may be applied in combination to other embodiments.

Therefore, although each embodiment is described mainly about an individual technical feature, the technical features of the embodiments of the present disclosure may be applied in combination, unless incompatible with each other.

The present disclosure is not limited to the above-described embodiments and the accompanying drawings, and various modifications and changes may be made in view of a person skilled in the art to which the present disclosure pertains. Therefore, the scope of the present disclosure should be determined by the scope of the appended claims, and equivalents thereof.

What is claimed is:

1. A method for displaying a message in a messenger service by a user terminal, the method comprising:
   receiving a message and a mask command for the message from a server when the message containing text information satisfies a preset condition for determining whether a restricted expression is included in the text information, the message having been received by the server from another different user terminal,
   wherein receiving the message and the mask command for the message from the server comprises:
      receiving, simultaneously, the message and the mask command from the server when an analyzation as to whether the message satisfies the preset condition is made within a predetermined threshold time, and
      receiving the message first and subsequently receiving the mask command from the server when the analyzation is made outside the predetermined threshold time; and
   displaying a mask message corresponding to the message in a chat room of the messenger service based on the mask command such that:
      the user terminal displays the mask message before the message is displayed when the message and the mask command are simultaneously received from the server, and
      the user terminal displays the mask message after the message is displayed when the message is received first and the mask command is subsequently received from the server.

2. The method of claim 1, further comprising:
   prior to receiving the mask command, displaying the message in the chat room, in an asynchronous mode.

3. The method of claim 2, further comprising:
   displaying a push message corresponding to the message; and
   based on the mask command, replacing the push message with a mask push message corresponding to the mask message.

4. The method of claim 1, further comprising:
   prior to displaying the mask message, receiving a reply message to the message from the server, wherein the reply message is generated by another user terminal; and
   displaying the reply message together with the message.

5. The method of claim 1, further comprising:
   acquiring a display interaction regarding the mask message; and
   in response to the display interaction, displaying the mask message in place of the message.

6. The method of claim 1, wherein the displaying of the mask message is performed depending on whether the user terminal has approved a display setting of the mask message in the messenger service.

7. The method of claim 1, wherein the displaying of the mask message comprises:
   identifying a restricted text corresponding to the preset condition in the text information; and
   displaying a text other than the restricted text in the message.

8. The method of claim 1, further comprising causing the user terminal to operate in an asynchronous mode by:
   receiving the message from the server when the analyzation as to whether the text information satisfies the preset condition exceeds the threshold time;
   displaying the message in the chat room;
   receiving the mask command when the text information satisfies the preset condition; and
   displaying the mask message by replacing the displayed message with the mask message in the chat room.

9. A user terminal for restricting display of a message in a messenger service, the user terminal comprising:
   a memory storing instructions; and
   a processor configured to execute the instructions to:
      receive a message and a mask command for the message from a server when the message containing text information satisfies a preset condition for determining whether a restricted expression is included in the text information, the message having been received by the server from another different user terminal,
   the processor further configured to:
      receive, simultaneously, the message and the mask command from the server when an analyzation as to whether the message satisfies the preset condition is made within a predetermined threshold time, and
      receive the message first and subsequently receive the mask command from the server when the analyzation is made outside the predetermined threshold time;
      display a mask message corresponding to the message in a chat room of the messenger service based on the mask command such that:

the user terminal displays the mask message before the message is displayed when the message and the mask command are simultaneously received from the server, and the user terminal displays the mask message after the message is displayed when the message is received first and the mask command is subsequently received from the server.

10. A method for restricting display of a message in a messenger service by a server, the method comprising:

receiving the message from a second user terminal;

analyzing whether text information extracted from the message satisfies a preset condition; and transmitting, when an analyzation as to whether the text information satisfies the preset condition is made within a predetermined threshold time and the text information satisfies the preset condition, the message and a mask command to a first user terminal to cause the first user terminal to display a mask message in place of the message in a chat room of the messenger service based on the mask command, wherein the preset condition comprises a condition for determining whether a restricted expression is included in the text information, the method further comprising:

selecting either a synchronous mode or an asynchronous mode for message handling based on whether the analyzation is made within the predetermined threshold time or outside the predetermined threshold time, wherein, in the synchronous mode, the server transmits the message and the mask command simultaneously to the first user terminal, and wherein, in the asynchronous mode, the server transmits the message to the first user terminal first, followed by transmitting the mask command upon completing the analyzation outside the predetermined threshold time; and causing the first user terminal to display the mask message corresponding to the message in the chat room of the messenger service such that:

in the synchronous mode the user terminal displays the mask message before the message is displayed, and in the asynchronous mode the user terminal displays the mask message after the message is displayed.

11. The method of claim 10, wherein the transmitting of the message is performed in response to acquiring a message transmission request from the first user terminal.

12. The method of claim 10, wherein the determining of whether the text information satisfies the preset condition is performed depending on whether a restriction setting of a chat room corresponding to the message is activated.

13. The method of claim 10, wherein the determining of whether the text information satisfies the preset condition comprises determining whether the text information comprises a preset keyword.

14. The method of claim 13, wherein:

the determining of whether the text information comprises a preset keyword comprises determining a restricted text matching the preset keyword in the text information, and the mask command is a command for the second user terminal to display a text other than the restricted text in the message.

* * * * *